Dec. 11, 1973  G. G. BRIGGS  3,778,500
METHOD OF PRODUCING NaF·2UF$_4$
Filed May 23, 1972
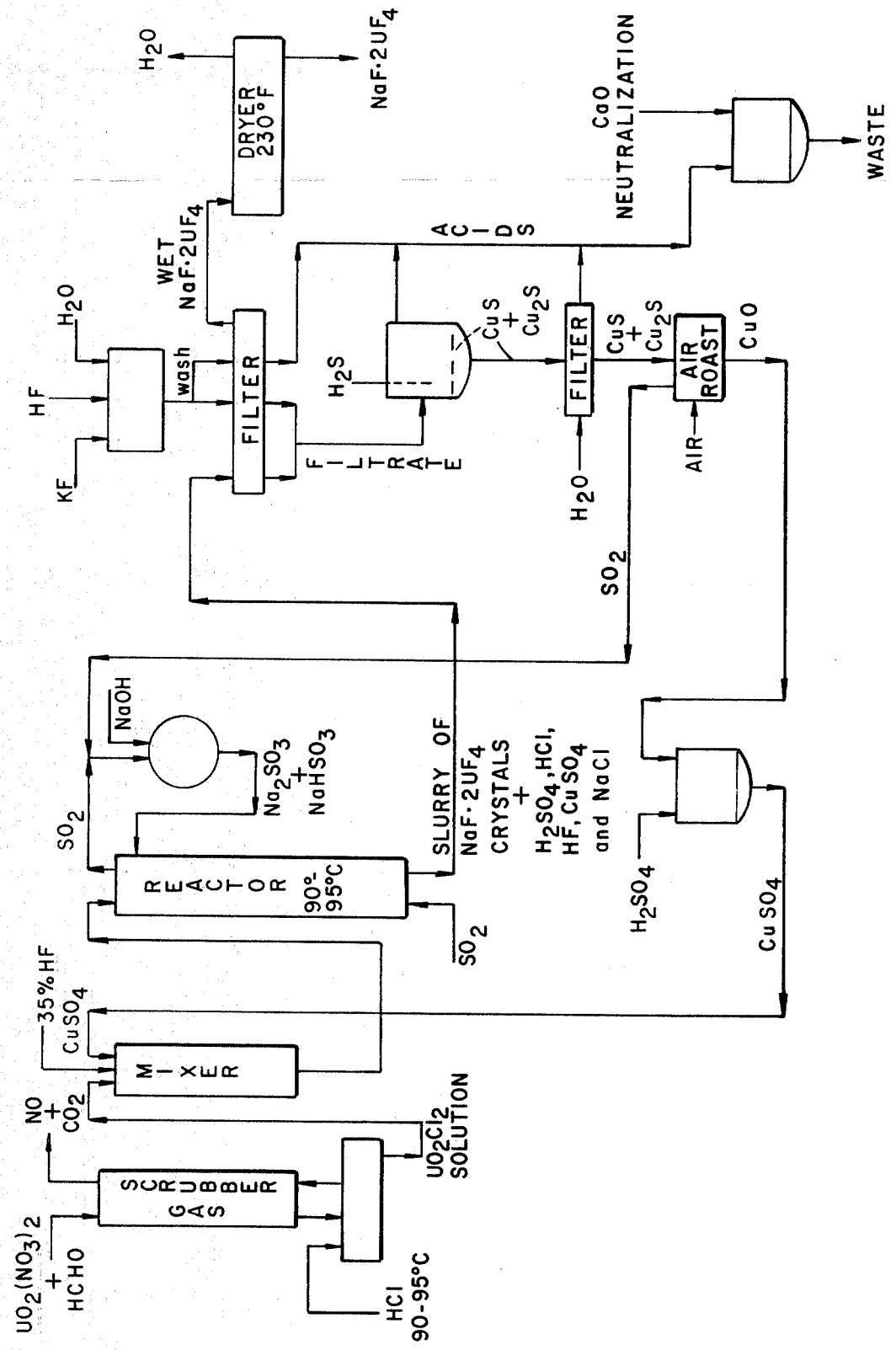

United States Patent Office 3,778,500
Patented Dec. 11, 1973

3,778,500
METHOD OF PRODUCING NaF·2UF₄
Gifford G. Briggs, Cincinnati, Ohio, assignor to the United States of America as represented by the United States Atomic Energy Commission
Filed May 23, 1972, Ser. No. 256,065
Int. Cl. C01g 43/00
U.S. Cl. 423—253                                      6 Claims

ABSTRACT OF THE DISCLOSURE

A method is described for the production of uranium metal from uranyl nitrate or uranyl chloride with an intermediate product of NaF·2UF₄.

BACKGROUND OF THE INVENTION

This invention was made in the course of, or under, a contract with the United States Atomic Energy Commission. It relates generally to a method of producing uranium metal from uranyl nitrate or uranyl chloride solutions.

In the past a method known as the "Winlo Process" has been used for the preparation of uranium tetrafluoride, $UF_4$, which was suitable for subsequent processing to uranium metal. This process involves the use of a nitrate-free feed solution of uranyl chloride, $UO_2Cl_2$. To this is added aqueous hydrofluoric acid, HF, and a small amount of copper sulfate as a catalyst. This solution is heated to about 90–95° C. and sparged with sulfur dioxide gas to reduce the uranyl ion. Over a period of a few hours, the single salt, $UF_4 \cdot \frac{3}{4} H_2O$, is precipitated as a dense crystalline phase and filtered from the solution, washed, and dried. A separate operation of considerable complexity is then used to remove the chemically bound water of hydration. This is accomplished by heating the $UF_4 \cdot \frac{3}{4} H_2O$ to about 800–900° F. in a stream of anhydrous hydrogen fluoride:

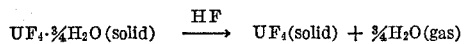

The HF cover gas is necessary to prevent the following reaction equilibrium from proceeding to the right:

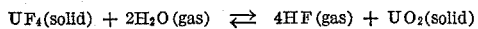

If the HF cover gas were not employed, the above reaction would proceed to the right causing a portion of the $UF_4$ to be converted to the oxide $UO_2$. The presence of this oxide is deleterious to the subsequent bomb reduction of the $UF_4$ to uranium metal, using magnesium as a reducing agent. The $UO_2$ is normally not completely reduced but tends to enter and coat the interface between molten uranium droplets and the molten magnesium fluoride slag phase. The coating, formed of minute solid particles of the $UO_2$ on the metal droplets, interferes with their complete coalescence and, thus, prevents complete separation of the two molten phases. At the high temperature necessary to remove the hydrate water, air must be absent; otherwise, the $UF_4$ would be oxidized partially to introduce impurities such as $UO_2F_2$ and $U_3O_8$ which are also deleterious to the subsequent reduction of the green salt to metal. The dehydration operation is done in a countercurrent system in which the powder is conveyed through metallic tubular reactors against the flow of anhydrous HF. The process often resulted in the significant pickup of metallic impurities from the equipment, especially during periods of startup when corrosion films which had formed on the equipment during downtime were abraded off. This process has a further disadvantage in the use of large amounts of HF.

Prior art processes are known which employ the use of a double salt as an intermediate product in the production of uranium metal. The primary reason for utilizing a double salt route stems from the fact that the double salts of $UF_4$ with the fluorides of the alkali and alkaline earth metals and ammonium ion can be quantitatively precipitated from aqueous solutions without retaining bound water of crystallization. Hence, these salts may be dried without resort to treatment at elevated temperatures. One such method involves the preparation of a NaF-$UF_4$ double salt. This system involves the precipitation of a sodium uranous fluoride double salt from a solution of uranyl nitrate containing formic acid when sparged with sulfur dioxide gas. The fluoride and sodium are added in a fixed ratio as the compound sodium fluoride, NaF. To provide the necessary fluoride to produce the double salt of stated composition—NaF-$UF_4$, at least five moles of fluoride ion must be added per uranium mole. Since the fluoride is added as NaF, the added sodium to uranium molar will also be at least five. With this high sodium concentration, it has been found that the double salt precipitated is primarily 2NaF·$UF_4$. If an attempt is made to lower the sodium to fluoride ratio by adding the sodium as a salt such as sodium chloride, NaCl, and the fluoride as hydrofluoric acid, HF, the reactions taking place in the system no longer precipitate a double salt. Instead, the nitrate present is reduced to a nitrogen oxide gaseous product.

A double salt of relatively high NaF to $UF_4$ ratio cannot be easily reduced to massive uranium metal by a bomb reduction technique using magnesium metal as the reductant. The greater the ratio of NaF to $UF_4$ present in the double salt, the more negative will be the heat of formation of the compound. This, together with the fact that the reaction products in the bomb reduction will contain more NaF, means that the heat of reaction developed during the bomb reduction will be insufficient for melting the bomb charge. Although some heat other than the heat of chemical reaction is introduced by preheating the bomb charge to the point of autoignition, the total heat available for producing reaction products in a molten state is marginal. As a result, the uranium metal is formed as filagree or small droplets which do not coalesce and separate from the slag as a single massive regulus. Post-heating of the reacted bomb charge to the very high temperatures required for keeping the phase molten long enough for phase separation is not practical since it poses severe restrictions on the materials employed in containing the reduction reaction and in maintaining the molten uranium free from impurities present in the containing materials.

If calcium metal replaces magnesium metal as the reducing agent for the higher NaF-$UF_4$ double salts, a much greater heat of reaction will be available. However, the use of calcium is undesirable because of its much greater cost and the probability that it will also reduce some of the sodium fluoride to metallic sodium. The high pressures developed during the reduction due to sodium vapor formation and the presence of metallic sodium during breakout of the reacted bomb charge to recover the uranium pose serious safety hazards.

SUMMARY OF THE INVENTION

It is thus an object of this invention to provide a process for producing uranium metal from a starting solution of uranyl nitrate or uranyl chloride whereby no processing step prior to final bomb reduction requires either temperatures exceeding approximately 230° F. or the use of anhydrous HF.

It is a further object of this invention to provide a process wherein the double salt of NaF and $UF_4$ containing the lowest ratio of sodium to uranium is produced.

It is a still further object of this invention to produce a double salt of NaF and $UF_4$ which can be reduced to uranium metal by conventional bomb reduction with magnesium.

These and other objects are accomplished by a process in which $NaF \cdot 2UF_4$ is used as an intermediate in the production of uranium metal. This process provides a route for the production of massive uranium metal which requires a minimum of expensive metal alloy equipment operating at elevated temperatures as is required in the above described prior art process of $UF_4$ manufacture. The process of this invention thus utilizes less expensive plastics such as polypropylene or rubber for construction and lining of equipment.

BRIEF DESCRIPTION OF THE DRAWING

The single figure of drawing represents a flow sheet of the process according to this invention.

DETAILED DESCRIPTION

According to this invention it has been found that uranium metal may be produced from a starting solution of uranyl chloride or uranyl nitrate by producing $NaF \cdot 2UF_4$ as an intermediate. A convenient source of uranyl nitrate or uranyl chloride solution is from solvent extraction or ion exchange purification of uranium ore concentrates or recycled uranium-bearing materials.

Although the preferred starting material is uranyl chloride solution, most existing uranium refining processes prepare purified uranyl nitrate solution by solvent extraction. Impure uranyl nitrate solution acidified with nitric acid is contacted in pulse columns with an organic liquid phase usually consisting of tributyl phosphate in a kerosene diluent. The uranyl nitrate is extracted into the organic phase while the majority of the impurities remain in the aqueous phase. The uranyl nitrate is reextracted from the organic phase back into water in another pulse column. This purified aqueous solution contains approximately 85 grams uranium per liter and may be concentrated by evaporation to reduce the volume for storage or for use in the next process step. For the purpose of this invention, the uranyl nitrate solution is concentrated to at least 300 grams uranium per liter.

Although less commonly employed, purification processes have been devised to produce uranyl chloride directly. These involve the use of ion exchange resins or liquid quaternary amines for extraction. Such processes would produce a solution of uranyl chloride also requiring evaporation for concentrating the uranium to a minimum of 300 grams per liter.

The overall process of this invention generally involves the following reactions which can be followed on the flow sheet of the accompanying figure of drawing.

(1) Conversion of uranyl nitrate solution to uranyl chloride solution by reaction with formaldehyde and hydrochloric acid:

$$2UO_2(NO_3)_2(sol'n) + 3HCHO(sol'n) + 4HCl(sol'n) \xrightarrow{90-95°C}$$
$$2UO_2Cl_2(sol'n) + 4NO(gas) + 3CO_2(gas) + 5H_2O(sol'n)$$

(2) Preparation of sodium sulfite-bisulfite solution:

$2NaOH(sol'n) + SO_2(gas) \longrightarrow$
$Na_2SO_3(sol'n) + H_2O(sol'n) Na_2SO_3(sol'n) + SO_2(gas) + H_2O(sol'n) \longrightarrow$
$2NaHSO_3(sol'n)$ (3) Precipitation of the double salt:

$$2UO_2Cl_2(sol'n) + NaHSO_3(sol'n) + SO_2(gas) + 9HF(sol'n) \xrightarrow[90-95°C]{CuSO_4(sol'n\ Catalyst}$$
$$NaF \cdot 2UF_4(solid) + 2H_2SO_4(sol'n) + 4HCl(sol'n) + H_2O(sol'n)$$

(4) Recovery of copper catalyst from spent solution of reaction 3:

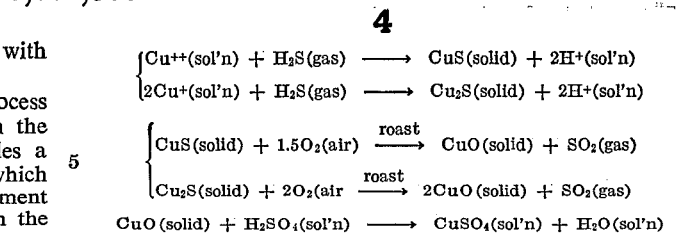

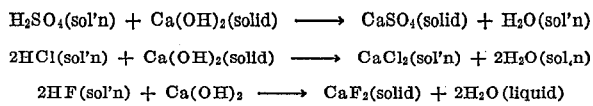

(5) Lime neutralization of spent acidic liquor from reaction 3 and following recovery of the copper:

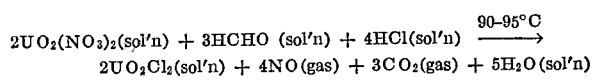
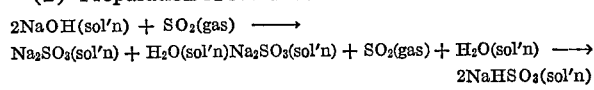
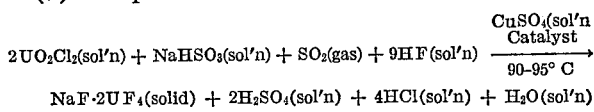

Reaction 1 is a convenient method for converting a uranyl nitrate feed solution to uranyl chloride. Another method would be the direct digestion of uranium feeds with sulfuric or hydrochloric acid and purification by anion exchange, or alternately, by liquid solvent extraction with a quaternary amine. It has been found that 1.5 moles of formaldehyde are required per mole of uranyl nitrate. A very small excess, not exceeding 5%, of the reagents—formaldehyde and hydrochloric acid—are needed to insure complete conversion to the chloride. A suitable method of carrying out the reaction in a continuous manner is by passing a cool mixture of the uranyl nitrate solution (concentrated to about 250–300 grams uranium per liter) and formaldehyde (at commercially available concentrations of 37 or 44 weight percent) down through a packed bed or plate-and-bubblecap column into a reactor vessel at the bottom. Hydrochloric acid at commercially available strengths such as 22° Baumé is fed continuously into the reactor vessel where it contacts the liquid mixture of uranyl nitrate and formaldehyde at a temperature maintained at about 90–95° C. A vigorous reaction evolves the gases NO and $CO_2$ which pass upwards through the packed bed or plate and bubblecap column where they are scrubbed by the downflowing uranyl nitrate-formaldehyde stream. Any traces of volatile HCl gas carried upwards in the gases will be scrubbed out and dissolved in the liquid phase. The NO and $CO_2$ emerge from the top of the packed bed or tower containing no volatile chloride. The NO—$CO_2$ mixture is then diluted with sufficient air to oxidize the colorless NO to red-brown nitrogen dioxide ($NO_2$), and the gas mixture is sent to an adsorber in which the $NO_2$ would be contacted with water to recover nitric acid. The countercurrent scrubbing of the gases with the incoming uranyl nitrate-formaldehyde liquid phase is to remove traces of volatile chloride which would be corrosive on stainless steel components of a nitric acid recovery system. Since the reaction taking place in the reactor vessel is exothermic, heat must be removed. A suitable method is to circulate the reaction solution through an external impervious graphite heat exchanger in which the heat is transferred to cooling water. An automatic control valve in the recirculation loop regulates the flow of reaction solution to maintain the temperature at 90–95° C. Since heat input is necessary to start the reaction, the heat exchanger preferably should also be equipped to alternately admit steam so that the process fluid may be heated to 90° C.

Reaction 2 represents the preparation of a sodium sulfite-bisulfite solution which will provide all of the sodium requirement for Reaction 3 and also a relative amount of the quadrivalent sulfur reducing agent required for Reaction 3. In carrying out Reaction 3, a part of the reducing agent is supplied as a sparge of $SO_2$ gas. That excess portion of the $SO_2$ gas which is not converted in a single pass through the solution to sulfate by the reduction reaction, and which is not adsorbed to maintain saturation of the liquid phase, will escape from the surface of the solution and will be drawn off to a gas scrubber. In the scrubber, a recirculating solution of sodium hydroxide will adsorb all but traces of the excess $SO_2$ gas to form a concentrated solution of sodium sulfite and sodium bisulfite. Sodium hydroxide is added to the scrubber at a preferred rate of 0.60 mole per mole $UO_2Cl_2$ entering the double salt precipitation equipment. Sufficient water is added to the sodium hydroxide makeup solution to maintain the concentration of sodium ion in the scrubber solution at a preferred concentration of four molar. A permissible range of 0.55 to 1.00 mole NaOH may be used per mole $UO_2Cl_2$ entering the double salt precipitation. A permissible range of sodium ion concentration in the scrubber liquor is 4 to 5 molar. The solution of sodium sulfite and sodium bisulfite is then cycled to the equipment in which Reaction 3 is carried out. In effect, the recycling of the $SO_2$ as the sodium sulfite-bisulfite salt makes possible essentially complete utilization of the $SO_2$ reducing agent.

Reaction 3 can be carried out batchwise in a single large agitated reaction vessel fitted with means for heating the process solution to about 90-95° C. and a $SO_2$ gas sparging system. However, it is preferred to use a continuous process. Continuous processes are simpler to operate and control by virtue of maintaining steady-state conditions. Many items of equipment can be reduced in size because they are in use constantly and not on an intermittent basis as is characteristic of batch processing.

In carrying out the Reaction 3 continuously, the process liquor or slurry flows through a number of reaction vessels arranged in series. Each vessel is considerably smaller in volume than that employed in carrying out the reaction batchwise at the same daily processing rate. A typical continuous system comprises three or four agitated vessels, each of which may take the form of vertical cylinders of rather high height-to-diameter ratio. The vessels may be arranged one above the other in order to take advantage of gravity flow between the reactor stages. Otherwise, pumps will be needed to transfer the process slurry from one stage to the next.

A typical feed solution entering the first reactor stage of a continuous reactor system at a controlled steady rate contains uranyl chloride, aqueous HF, and copper sulfate. The uranium concentration should be about 170 grams uranium per liter, although it may be as high as 185 grams uranium per liter. Higher concentrations result in the precipitation of the solid phase $UO_2F_2$ from the feed solution at temperatures below approximately 70° F. Other concentrations are approximately 1.50 molar chloride, 4.6 molar fluoride, 0.075 molar copper sulfate, and 4.6 molar hydrogen ion. Also entering the first stage and optionally also the second stage will be controlled flow of a 4-5 molar solution of sodium sulfite-bisulfite. The second and succeeding stages are sparged with $SO_2$ gas. The sodium-bearing solution is introduced preferably in the ratio of 0.60 mole of sodium per mole of uranium. This provides a 20% excess of sodium over that required to form the double salt, $NaF \cdot 2UF_4$. However, the sodium should be maintained at at least 10% over that stoichiometrically required to form the double salt, $NaF \cdot 2UF_4$. Lower sodium excess risks the formation of the single hydrated $UF_4 \cdot \frac{3}{4}H_2O$ during the final stages of precipitation. The sodium excess can be increased, but must be held less than approximately 100%. With a 100% excess, a higher double salt will begin to form during the initial phase of the precipitation.

As Reaction 3 proceeds, particles of olive-colored double salt, $NaF \cdot 2UF_4$, form. The salt tends to settle in the mother liquor despite rather intense agitation, and, because of this, the partially reacted slurry is withdrawn from the bottom of each stage during transfer to succeeding stages. Bottom withdrawal tends to remove those particles which have undergone more growth and which, therefore, tend to settle more readily. The smaller particles tend to remain suspended and thus undergo further growth before being discharged to the succeeding stage. After a period of startup, an equilibrium steady state is attained in which the concentration of solid phase in each stage will be less than that encountered in a batchwise reaction which has proceeded to the same level of completion. Bottom withdrawal of the slurry from each reactor stage results in a coarser average particle size in the final product. As a result, removal of the solid phase by filtration from the spent mother liquor is more rapid. It is preferred to have a final mother liquor uranium concentration of less than 0.015 gram uranium per liter.

It will be noted that the precipitation of the double salt depends on the presence of both chloride and cupric ions in the feed solution. These ions combine to form a cupric chloride complex ion (probably $CuCl_4^-$) which is then reduced by $SO_2$ to a cuprous chloride complex ion (probably $CuCl_2^-$). The uranyl ion $UO_2^{++}$ is then reduced by the cuprous complex to produce the uranous ion $U^{+4}$ and regenerate the cupric chloride complex. Thus, copper acts as a catalyst and is not consumed by the overall reaction. The uranous ion then combines with sodium and fluoride ions to precipitate the double salt. The double salt precipitates as rather well-developed, platy, rhomb-shaped crystals.

It should be further noted that Reaction 3 does not have to be strictly adhered to. Reaction 3 is written as only one possible case with regard to the species supplying quadrivalent sulfur. It implies that half the reduction reaction is done by the $SO_2$ sparge gas, and half is done by recycled $HSO_3^-$ ion. Actually, any combination of $SO_2 + HSO_3^- + SO_3^=$ ions adding up to two moles quadrivalent sulfur would be operable.

The final slurry from the last precipitation stage filters very rapidly in a vacuum filter and the crystalline cake is then washed with water containing about one gram dissolved potassium fluoride (KF) per liter and a few drops of aqueous HF per liter to lower the pH to 3. These additives suppress the very slight solubility of the double salt.

The filtrate and initial portion of the wash solution contains valuable copper values which may be easily recovered and recycled to the process (Reaction 4). The spent acidic liquor from the double salt precipitation will contain chloride, sulfate, sulfite, fluoride, sodium, cupric and cuprous ions. When treated with a sparge of hydrogen sulfide gas, the copper is precipitated as very insoluble sulfides. These will settle rapidly in the mother liquor to the bottom of the tank in which the reaction is carried out. The copper-free solution may be continuously withdrawn as overflow from the top of the vessel and sent to lime neutralization. When a sufficient quantity of the precipitated sulfides are collected, they may be flushed as a concentrated slurry to a small filter for recovery. The copper sulfides are then roasted at red heat to convert them to black cupric oxide in a small furnace. The sulfur dioxide gas which is driven off may be scrubbed out in the same scrubber referred to previously to form sodium sulfite-bisulfite solution. The cupric oxide, CuO, is then dissolved in a small vessel with concentrated sulfuric acid to produce a solution of copper sulfate. This solution is then recycled to the uranyl chloride feed makeup. The quantity of copper catalyst used is small (about 56 pounds copper per ton of uranium processed). Hence the copper recovery would be carried out on an intermittent basis.

Another method has been studied for the recovery of copper from spent Winlo process solutions. This is based on the reduction of the copper with iron.

The acidic waste liquor after copper removal is neutralized by slurrying with hydrated lime in an agitated tank in accordance with Reaction 5. Insoluble calcium salts of sulfate, sulfite, and fluoride are formed. Calcium chloride and a small amount of sodium chloride remain in solution. The waste slurry can then be dumped in a waste pit.

The double salt, $NaU_2F_9$, recovered from the filtration and washing step can then be dried in an air atmosphere at a temperature no greater than 230° F.

The double salt, $NaF \cdot 2UF_4$, may be reduced to massive uranium metal using the same bomb reduction technique as is commonly employed to reduce the single salt, $UF_4$. The double salt may also be mixed in any ratio with the single salt in these reductions. The reactions have been conducted in 7½-inch diameter, 20-inch high, cylindrical steel bombs flanged at the top and closed with a bolted steel lid. Gasket closures are not used. These bombs are of such size that the reduction charges with 100% $NaF \cdot 2UF_4$ would contain 20 pounds of uranium. With the single salt, $UF_4$, produced by gaseous hydrofluorination of $UO_2$, the charge normally contains 30 pounds of uranium. The lower quantity of uranium produced from the double salt stems from its lower density and uranium content (2.2 grams per cc. tap density and 71.05% U). A typical $UF_4$ has a tap density of 3.5 grams per cc. and contains 75.80% U. The reducing agent is granular magnesium metal, and, in this scale reduction, a 4% excess was used. Thus, a typical reduction charge consisted of a blended mixture of 27.92 pounds of $NaF \cdot 2UF_4$ (containing 19.84 pounds uranium) and 4.22 pounds of magnesium granules. Mild steel bombs were lined with compacted magnesium fluoride powder prepared from the slag masses recovered from previous $UF_4$ reductions. The liner is formed by inserting a tapered steel mandrel into the reduction pot and jolt-packing the powder into a nominal half-inch clearance between the mandrel and the pot wall and bottom. After withdrawing the mandrel, the blended charge of $NaU_2F_9$ (or a mixture of $NaU_2F_9$ with $UF_4$) and magnesium is scooped into the lined cavity and tamped down tightly. A space of at least ¾-inch is left between the top of the tamped charge and the top edge of the pot flange. This is filled with tamped liner material. The capping material is smoothed flush with the top of the pot flange, and the lid is bolted into place.

The charged reduction pot is placed in an electrically heated muffle furnace which has been preheated to 1250–1300° F. After approximately two hours, the bomb charge fires by self-ignition. This usually occurs when the outer periphery of the bomb charge reaches about 1200° F. (the melting point of the magnesium). The ensuing rapid reaction is completed under nearly adiabatic conditions and produces a completely molten reaction mass consisting of a uranium phase and a slag phase composed of sodium and magnesium fluorides in the molar ratio of one to four. The heavy uranium phase coalesces and sinks to the bottom of the lined cavity to form a single metal regulus while the molten slag freezes out over the metal. The overall consolidation of the reaction charge leaves a large cavity above the slag. Excess magnesium distills from the reaction mass and deposits as droplets on the interior walls of this cavity.

With 100% $NaF \cdot 2UF_4$ in the bomb charge, the peak temperature reached in the reaction mass is about 2280° F. as measured by a tantalum-sheathed thermocouple. With 100% $UF_4$, the peak temperature is normally about 2550° F. The indicated peak temperature with the double salt does not quite reach the melting point of magnesium fluoride (2305° F.), but the $NaF-MgF_2$ slag is completely molten because of the eutectic formation in the system.

The reduction reaction with $NaF \cdot 2UF_4$ proceeds with no detectable violence or noise; whereas, reductions of the hydrofluorinated type single salt usually produce noise and vibration. The reaction with $NaU_2F_9$ is detected only by the rise in temperature of a thermocouple pressed against the bomb wall at a height corresponding to the zone of slag formation.

Separation between slag and uranium is very nearly perfectly complete with 100% $NaF \cdot 2UF_4$ charges. The reduction yield usually exceeds 99%. With the double salt, it is important to preheat the bombs uniformly over their height. Failure to this may lead to incomplete reactions characterized by black slag containing unreduced $UF_3$. The effect may be more pronounced for reductions of $NaU_2F_9$ than with $UF_4$ because of the lower heat of reaction available with the double salt.

What is claimed is:

1. A process for preparing $NaF \cdot 2UF_4$ suitable for reduction to uranium metal comprising the steps of preparing an aqueous solution comprising uranyl chloride, sodium ions, hydrofluoric acid, quadrivalent sulfur and a copper sulfate catalyst in amounts effective to produce $NaF \cdot 2UF_4$, heating said solution to about 90 to 95° C. to produce $NaF \cdot 2UF_4$ as a reaction product, and separating said $NaF \cdot 2UF_4$ from other reaction ingredients.

2. The method according to claim 1 wherein said uranyl chloride is prepared by reacting uranyl nitrate with formaldehyde and hydrochloric acid at 90–95° C. so as to form said uranyl chloride.

3. The method according to claim 1 wherein said step of separating comprises filtering solid $NaF \cdot 2UF_4$ from a mother liquor and the filtrate from said filtering step contains chloride, sulfate, sulfite, fluoride, sodium and cupric ions and said cupric ions are recovered from said filtrate by precipitation as copper sulfide by sparging said filtrate with hydrogen sulfide and said copper sulfide is converted to copper sulfate for reuse as said catalyst.

4. The method according to claim 1 wherein said uranyl chloride is provided in a feed makeup solution, said feed makeup solution comprising 140 to 185 grams uranium per liter, at least 4.5 moles HF per mole of uranium with an excess of 15 to 25 grams HF per liter of said feed makeup solution and a catalytic amount of copper sulfate, and said step of preparing comprises mixing said feed makeup solution with a second solution to provide a reaction solution, said second solution comprising sodium ions at a concentration of 4 to 5 molar, and quadrivalent sulfur supplied from the group consisting of sulfite or bisulfite ions or mixtures thereof, said step of mixing is done in a volumetric ratio to provide sodium ions from said second solution at 0.55 to 1.00 mole per mole of uranium from said feed makeup solution, and further comprising sparging said reaction solution with $SO_2$, said $SO_2$ being supplied in an amount such that the total quadrivalent sulfur provided by said $SO_2$, sulfite and said biulfite is sufficient to completely reduce uranyl ions which are present, and heating said reaction mixture to about 90 to 95° C. and thus precipitating said $NaF \cdot 2UF_4$.

5. The method according to claim 4 wherein said feed makeup solution contains 170 grams uranyl chloride per liter, 89 grams HF per liter, and 12 grams copper sulfate per liter and wherein said second solution contains sodium at a molarity of 4 and a total sulfite and bisulfite molarity of equal to or less than 4, said volumetric ratio is 0.107 liter of said second solution to 1.00 liter of said feed makeup solution, and said total quadrivalent sulfur in said reaction is greater than one mole per mole of uranium.

6. The method according to claim 1 wherein said quadrivalent sulfur is supplied from the group consisting of sulfite ions, bisulfite ions and dissolved $SO_2$ gas.

References Cited
UNITED STATES PATENTS

| | | | |
|---|---|---|---|
| 3,023,078 | 2/1962 | Allen et al. | 423—259 |
| 3,073,671 | 1/1963 | Pagny et al. | 423—253 |
| 2,880,059 | 3/1959 | Tolley | 423—253 |

BENJAMIN R. PADGETT, Primary Examiner

R. L. TATE, Assistant Examiner

U.S. Cl. X.R.

252—301.1 R; 423—259